US012634799B2

(12) United States Patent
Weingartner et al.

(10) Patent No.: US 12,634,799 B2
(45) Date of Patent: May 19, 2026

(54) MESH NETWORK MANAGEMENT OF SPACE-DEPLOYED SYSTEMS

(71) Applicant: Lockheed Martin Corporation, Bethesda, MD (US)

(72) Inventors: Nickolas Andrew Weingartner, Schwenksville, PA (US); Michael Robert Blithe, Newtown Square, PA (US); Nathan Swavely Goudie, Douglassville, PA (US); Matthew Brett Doyle, Flourtown, PA (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 353 days.

(21) Appl. No.: 18/534,332

(22) Filed: Dec. 8, 2023

(65) Prior Publication Data

US 2025/0193770 A1 Jun. 12, 2025

(51) Int. Cl.
| | |
|---|---|
| *H04W 84/06* | (2009.01) |
| *H04W 40/12* | (2009.01) |
| *H04W 40/24* | (2009.01) |
| *H04W 84/18* | (2009.01) |

(52) U.S. Cl.
CPC ......... *H04W 40/246* (2013.01); *H04W 40/12* (2013.01); *H04W 84/06* (2013.01); *H04W 84/18* (2013.01)

(58) Field of Classification Search
CPC .............................. H04W 40/246; H04W 40/12
USPC ......................................................... 370/230
See application file for complete search history.

(56) References Cited

U.S. PATENT DOCUMENTS

2024/0056882 A1* 2/2024 Vaughan ........... H04W 28/0289

FOREIGN PATENT DOCUMENTS

| CN | 115941024 A | * | 4/2023 |
|---|---|---|---|
| CN | 116455449 A | | 7/2023 |
| EP | 3547568 A1 | | 10/2019 |

OTHER PUBLICATIONS

Boriboon; "Optimizing Communication Utility of Routing Protocol for Satellite IP Networks"; ResearchGate; Dec. 2016; 275 pages; https://www.researchgate.net/publication/318455894_Optimizing_Communication_Utility_of_Routing_Protocol_for_Satellite_IP_Networks.

(Continued)

*Primary Examiner* — Sibte H Bukhari

(57) ABSTRACT

Provided herein are various enhancements for establishing dynamic mesh networking across a constellation of satellites and ground stations. An example method includes obtaining a request to generate a communication network for a time interval among a constellation of satellites. The method also includes identifying one or more connectivity graphs for the constellation based on a state of the constellation during at least the time interval and applying a selected routing algorithm against the one or more connectivity graphs to generate a communication route among the constellation during the time interval. The method further includes producing a set of parameters to configure routing of the communication route among the constellation to establish the communication network for the time interval.

17 Claims, 9 Drawing Sheets

(56)                       References Cited

OTHER PUBLICATIONS

Ivancic, William D. et al., "Secure, Autonomous, Intelligent Controller for Integrating Distributed Emergency Response Satellite Operations," 2013 IEEE Aerospace Conference, 10 pages, Mar. 2-9, 2013.

Miller, Eric et al., "Virtual Mission Operations Center Explicit Access to Small Satellites by a Net Enabled User Base," The 4S Symposium: Small Satellites Systems and Services, 6 pages, May 26-30, 2008.

* cited by examiner

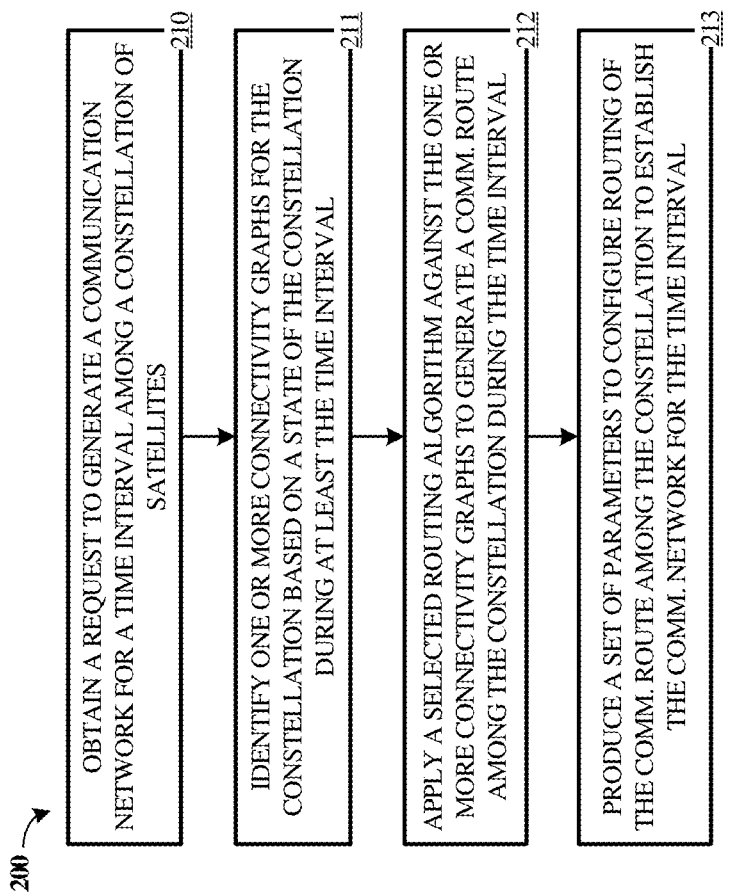

OBTAIN A REQUEST TO GENERATE A COMMUNICATION NETWORK FOR A TIME INTERVAL AMONG A CONSTELLATION OF SATELLITES — 210

IDENTIFY ONE OR MORE CONNECTIVITY GRAPHS FOR THE CONSTELLATION BASED ON A STATE OF THE CONSTELLATION DURING AT LEAST THE TIME INTERVAL — 211

APPLY A SELECTED ROUTING ALGORITHM AGAINST THE ONE OR MORE CONNECTIVITY GRAPHS TO GENERATE A COMM. ROUTE AMONG THE CONSTELLATION DURING THE TIME INTERVAL — 212

PRODUCE A SET OF PARAMETERS TO CONFIGURE ROUTING OF THE COMM. ROUTE AMONG THE CONSTELLATION TO ESTABLISH THE COMM. NETWORK FOR THE TIME INTERVAL — 213

| Transit Node | MPLS Label |
|---|---|
| Satellite 311 | 101 |
| Satellite 312 | 102 |
| Satellite 313 | 103 |
| Satellite 314 | 104 |

402 ↗

| ID | Source Node | Destination Node | Destination IP Prefix |
|---|---|---|---|
| 1 | DN1 | DN4 | 40.40.40.0/24 |
| 2 | DN4 | DN1 | 10.10.10.0/24 |

403 ↗

| Incoming Label | Outgoing Label | Outgoing I/F | Next Hop Address | MPLS Op. |
|---|---|---|---|---|
| 101 | | Loopback | | POP |

404 ↗

| Destination IP Prefix | Outgoing I/F | Next Hop Address |
|---|---|---|
| 10.10.10.0/24 | GEO/0 | |

405 ↗

| Destination IP Prefix | Outgoing Label | Outgoing I/F | Next Hop Address |
|---|---|---|---|
| 40.40.40.0/24 | 104 | GEO/1 | 192.168.1.2 |

FIGURE 4

MESH NETWORK MANAGEMENT OF SPACE-DEPLOYED SYSTEMS

TECHNICAL BACKGROUND

As satellite constellations grow in size, the complexity of communications between space assets (e.g., satellites, ground stations, and other spacecraft) becomes increasingly difficult, especially in low-Earth orbits which have satellites passing over the horizon from each other and ground stations. To execute missions while in orbit, each satellite may manage one-to-many communication crosslinks to other satellites and vehicles while adjusting for factors, such as orbit, connectivity, ground communication, and other user communication that may affect the availability and timing for communications of a satellite.

In many existing solutions, satellites might only communicate with ground stations when the satellite has a direct line-of-sight to a ground station. In geostationary orbits, this is often not problematic, but in lower orbits closer to Earth, this may limit available communication windows for satellites. Satellite communication cross-linking was developed to overcome the need for orbital satellites to only communicate through ground stations. However, this cross-linking may occur only within a small coverage area if and when a pair of satellites are close together and have a line-of-sight to each other. Regardless of whether cross-linking is employed, routing communications and configuring satellites for cross-linking and satellite-to-ground communications has been cumbersome and frequently employs a human operator to attempt to optimize operations.

Overview

The description herein provides enhanced techniques and systems that provide for dynamic configuration of communication networks among space assets, such as satellites and accompanying ground stations, or other various types of nodes and endpoints. An orchestration system is provided which establishes the configuration and monitoring of ad-hoc communication networks spanning over satellites within one or more orbital constellations. Client-provided requests can be processed against satellite status information, such as windows of communication between nodes, to produce router configuration files usable to configure satellites in situ and establish various network routing over satellites with communication cross-linking for selected timeframes. Moreover, pluggable network routing and optimization algorithms can be customized and selected on-the-fly by users or network operators, and resultant router configuration files can provide router configurations for many different types of routers and associated software/hardware. In this manner, users can rapidly deploy and monitor satellite-based communication networks through interactive user interfaces.

One example implementation includes a method for establishing a communication network among space assets. The method includes obtaining a request to generate a communication network for a time interval among a constellation of satellites. The method also includes identifying one or more connectivity graphs for the constellation based on a state of the constellation during at least the time interval and applying a selected routing algorithm against the one or more connectivity graphs to generate a communication route among the constellation during the time interval. The method further includes producing a set of parameters to configure routing of the communication route among the constellation to establish the communication network for the time interval.

Another example implementation includes a system comprising an interface module and a network orchestration module. The interface module is configured to obtain a request to generate a communication network among a constellation of satellites for a time interval indicated by the request. The network orchestration module is coupled to the interface module and is configured to receive the request from the interface module, identify one or more connectivity graphs for the constellation based on a state of the constellation during at least the time interval, apply a selected routing algorithm against the one or more connectivity graphs to generate a communication route among the constellation during the time interval, and produce a set of parameters to configure routing of the communication route among the constellation to establish the communication network for at least the time interval.

In yet another example, an apparatus is provided. The apparatus comprises one or more computer-readable storage media and program instructions stored on the one or more computer-readable storage media executable by a processing device to direct the processing device to perform functions. For example, the program instructions may direct the processing device to obtain a request to generate a communication network for a time interval among a constellation of satellites, identify one or more connectivity graphs for the constellation based on a state of the constellation during at least the time interval, apply a selected routing algorithm against the one or more connectivity graphs to generate a communication route among the satellites during the time interval, and produce a set of parameters to configure routing of the communication route among the constellation to establish the communication network for the time interval.

This Overview is provided to introduce a selection of concepts in a simplified form that are further described below in the Detailed Description. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

FIG. 2 illustrates a method of establishing a communication network between satellites in a constellation in an implementation.

FIG. 4 illustrates exemplary routing tables used to configure a communication network in an implementation.

DETAILED DESCRIPTION

Figure 1:
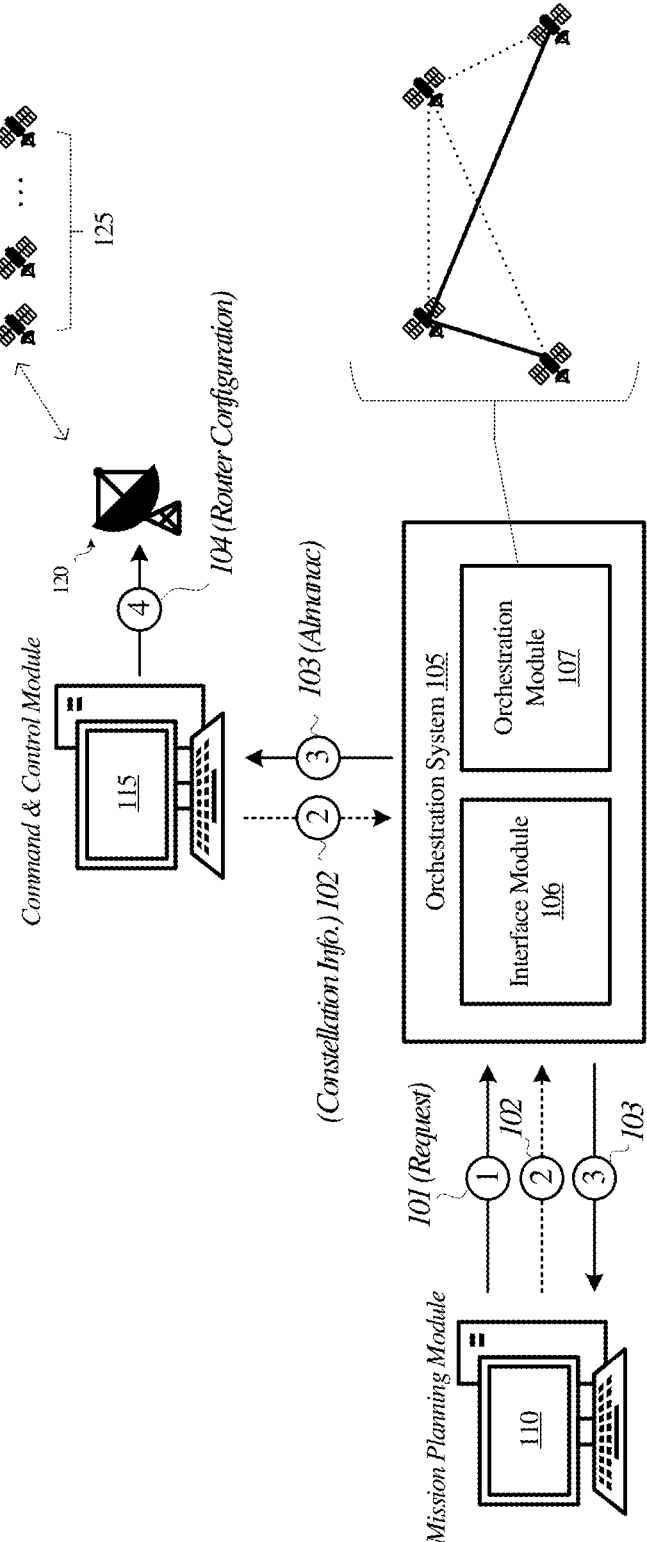
FIG. 1 illustrates an exemplary operating environment demonstrating configuration of a communication network among satellites in a constellation.

Satellites can be positioned in various orbital configurations about a central body, such as Earth, and arranged in various types of constellations. Each satellite may include communication equipment and associated on-board communication systems, which may include hardware elements, such as antennas, transceivers, and networking devices (e.g., routers, relays, or switches), and software elements, such as software-defined network elements and associated processing devices. This communication equipment and software may be configured to establish communication links between one or more other satellites to provide a communication network (or networks) that can be used to route traffic between endpoints. These endpoints may include ground-based nodes, or may instead include airborne, seaborne, orbital, or other various locations and types of endpoints.

An orchestration system can be provided which coordinates the communications, configuration, and operation of various satellite-based communication systems. Frequently, ground-based control nodes can perform these orchestration functions, which then relay instructions and commands to the satellites for on-orbit configuration of the satellites. Once configured, the satellites can operate to route traffic among various endpoints, set up and tear down communication links, establish networks and network routing arrangements, and monitor network status and telemetry for delivery to the control nodes.

Discussed herein are enhanced orchestration elements and corresponding techniques for management of network resources among a satellite system. In one example, an orchestration system is capable of producing router configuration parameters to establish various customizable communication pathways and communication networks within a constellation of satellites. Clients or users may provide requests including desired operating parameters for the communication network, such as network endpoints, and targets for bandwidth, latency, and the like, along with a time interval for operation of the communication network. Clients or users may also provide information about the satellites, such as capabilities of the satellites and equipment thereof (e.g., router capabilities), a number of the satellites, a current location of the satellites among the constellation, and the like. This information may also be provided by the orchestration element based on monitored status of corresponding satellites. Based on the constellation information and desired operating and timing parameters of the communication network, the orchestration system can identify satellites with which to establish the communication network and a routing path between the identified satellites. The orchestration system can produce router-agnostic configuration files that can be translated into vendor specific format files and uploaded/uplinked or used to configure settings of communication equipment onboard the satellites.

One example implementation includes a method for establishing a communication network among space assets. The method includes obtaining a request to generate a communication network for a time interval among a constellation of satellites. The method also includes identifying one or more connectivity graphs for the constellation based on a state of the constellation during at least the time interval and applying a selected routing algorithm against the one or more connectivity graphs to generate a communication route among the constellation during the time interval. The method further includes producing a set of parameters to configure routing of the communication route among the constellation to establish the communication network for the time interval.

Turning now to the Figures, FIG. 1 illustrates an exemplary operating environment 100 demonstrating a configuration of a communication network among satellites in a constellation. Operating environment 100 includes orchestration system 105, mission planning module 110, command and control module 115, ground station 120, and satellites 125. Orchestration system 105 includes interface module 106 and orchestration module 107. In various examples, orchestration system 105 may be configured to perform communication network configuration processes, such as operational scenario 200 of FIG. 2.

Orchestration system 105 may be representative of a system or apparatus including various hardware, software, and/or firmware components, such as interface module 106 and orchestration module 107, capable of communicating with mission planning module 110 and command and control module 115 to receive inputs (e.g., request 101, constellation information 102) and to provide outputs (e.g., almanac 103) with which command and control module 115 may use to configure communication elements of satellites 125. Orchestration system 105 may communicate with mission planning module 110 and command and control module 115 using a communication protocol. For example, orchestration system 105 may communicate with each element using one or more application programming interfaces (API) (e.g., a REST API).

Mission planning module 110 may be representative of a computing device, such as a computer, tablet, smart phone, or other device, capable of configuring and viewing missions and activities of satellites 125 (e.g., a mission planning system) and determining when satellites 125 and ground station 120 can communicate based on orbits and positioning data. Mission planning module 110 may also, or instead, be representative of an application program that may be executed by a computing device. In various examples, mission planning module 110 may include a user interface through which a user can submit request 101 that includes a set of requirements corresponding to a desired communication network, and characteristics and performance thereof, between satellites 125 for a time interval. The set of requirements may include identities of preferred satellites in the constellation of satellites 125 to be included in the communication network (e.g., a starting satellite and an ending satellite to be included in the communication network), a bandwidth target, a latency target, a quality of service target, a selected routing algorithm, and a timeframe target that includes the time interval during which the communication network is to be established. Various other parameters, preferences, inputs, target metrics, and modes of operation can be specified.

Command and control module 115 may be representative of a computing device, such as a computer, tablet, smart phone, or other device capable of configuring parameters of satellites 125 or equipment thereof, controlling operations of satellites 125, and the like via ground station 120. Command and control module 115 may include a user interface through which a user can view constellation information 102, configure satellites 125, and control satellites 125 via ground station 120. In some example embodiments, mission planning module 110 and command and control module 115 may be the same device. In other embodiments, mission planning module 110 and command and control module 115 may be different devices operating in the same or in a different environment.

Constellation information 102 may include information about satellites 125, such as a number of satellites 125 in a constellation, the types of satellites 125, respective locations of satellites 125 within the constellation, capabilities of satellites 125 (e.g., types of equipment onboard satellites 125), transit nodes of the constellation (e.g., satellites, ground stations, other space assets), access nodes within the constellation (e.g., network, gateway, loopback from which data is received and to which data is sent by way of one or more transit nodes), data flows between satellites 125 and a communication network (e.g., logical connections between two access nodes that need to send data to each other), and the like. In some examples, orchestration system 105 may receive or otherwise obtain constellation information 102 from mission planning module 110 or command and control module 115. In other examples, orchestration system 105 may receive, obtain, or access constellation information 102 from a data structure of or coupled to orchestration system 105.

Satellites 125 may include any number of satellites in orbit around Earth (e.g., low-Earth orbit) or a terrestrial object, in cislunar orbit, or in deep space. Each of satellites 125 may include hardware, software, and/or firmware elements to communicate with each other and ground station 120, to capture data during orbit, and to control operations of elements onboard satellites 125 per instructions from command and control module 115. In an example embodiment, satellites 125 each include routers and other networking equipment that can be configured in different ways at varying times to establish a communication network among a number of satellites 125 and ground station 120, among other ground stations (not shown). In another example embodiment, satellites 125 each include software-defined elements that can perform router and networking functions to establish a communication network among a number of satellites 125 and ground station 120.

Also, although the term satellite is used herein, it should be understood that other vehicles can be employed, such as any spacecraft, space probes, satellites of various types and in various orbital configurations, and other spacefaring devices. Moreover, satellite devices can be included in sets or constellations which may be defined by orbital configuration groupings, or might be logical groupings of satellites, among other partitioning. Included in these sets may be other vehicles or devices which interface with satellites, such as aircraft, balloons, drones, unmanned aerial vehicles (UAVs), sea faring vessels, submarine vessels, terrestrial vehicles and stationary equipment (e.g., ground stations, facilities, installations), user equipment, computing devices, network equipment, and other various devices, vehicles, and equipment.

In operation, interface module 106 may be configured to receive requests, such as request 101 from mission planning module 110. Interface module 106 can also receive or otherwise obtain constellation information 102 from mission planning module 110 or command and control module 115. Interface module 106 can provide both request 101 and constellation information 102 to orchestration module 107. Orchestration module 107 may be configured to produce almanac 103 to configure routing of communications between at least some of satellites 125 identified in request

101, constellation information 102, and states of the identified satellites 125. Almanac 103 may include a group of graph-based data, routing tables, and router configuration parameters for a particular time interval or time segment.

In various examples, to produce almanac 103, orchestration module 107 may identify a current state of satellites 125 based on constellation information 102. The current state may refer to positions and orientations of satellites 125 relative to one another and to earth or to specific terrestrial locations (such as ground station 120), which may be identified using telemetry data, ephemeris data, and/or calculated trajectories of each satellite. Orchestration module 107 may further identify a future state of satellites 125 by identifying scheduled maneuvers of satellites 125 during the time interval specified in request 101. The scheduled maneuvers may indicate time-tagged connectivity changes to be made during the time interval, such as adding or removing a connection between a satellite and another space asset.

Next, orchestration module 107 identifies connectivity graphs for the constellation of satellites 125 for the time interval identified in request 101 based on a state of the constellation. More specifically, orchestration module 107 can generate a connectivity graph from the perspective of the constellation and including each satellite implicated by request 101 during one or more time slices within the time interval. The connectivity graphs for each time slice may include a mapping indicating implicated satellites and communication lines-of-sight from a satellite to one or more other satellites or terrestrial locations, which may include reachability metrics corresponding to a physical distance or communication distance between each satellite or communication nodes thereof, a duration for which a given pair of satellites can communicate with each other (i.e., contact between satellites), a projected quality of communication between a given pair of satellites, a projected signal strength of the communication between a given pair of satellites, and the like, during the time slice. The connectivity graphs may include a graph or chart with edges, vertices, and indications illustrative of a satellite, neighboring satellites, and respective positions thereof.

Orchestration module 107 can utilize information from each connectivity graph during the time interval to create a reachability matrix that may include the reachability metrics and mappings from the perspective of each satellite. The reachability matrix might include all satellites of a constellation or a subset of satellites, may span over many constellations, and can indicate a validity timeframe for each communication during the entire time interval. In some examples, the reachability matrix may include a graph including edges, vertices, and data corresponding to the implicated satellites and communication parameters between the satellites. In other examples, the reachability matrix may include one or more tables or other data structures or mathematical formats.

Orchestration module 107 can then apply a selected routing algorithm against the connectivity graph for the constellation. The routing algorithm can be selected using various techniques, such as being specified in request 101, or selected from among a set of predefined algorithms provided by orchestration module 107. In this manner, a user might select from among several provided algorithms, or may instead be provided/selected on-the-fly or according to functional descriptions or mission requirements. Example routing algorithms include one or more among a lowest latency routing algorithm, a highest bandwidth routing algorithm, a shortest distance routing algorithm, a hop minimization algorithm, and a Dijkstra's routing algorithm, among others.

The routing algorithm can be selected to optimize, minimize, or maximize certain parameters, such as latency, distance, availability timeframe, bandwidth, or other factors. Based on the selected routing algorithm, orchestration module 107 can identify edge weights, factors, or costs for each communication path identified in the connectivity graph or connectivity matrix and determine a route among a number of satellites 125 to establish the communication network which satisfies the requirements of at least request 101.

Orchestration module 107 can generate a set of routing tables for each node based on the results of applying the routing algorithm to the connectivity graph. The routing tables may include a data flow table, a primary label registry, a forwarding information base (FIB) table, a label forwarding information base (LFIB) table, and an Internet-Protocol (IP) forwarding table, among other information. Orchestration module 107 may include this information in multiple formats such that the information can be applied to any router to configure the route for the communication network among satellites 125. Thus, in some examples, one or more universal routing tables are determined, which may include parameters, addresses, and other parameters for configuring the communication network across many different types of routing equipment employing different manufacturers, brands, versions, protocols, interface control schemes, and the like. Orchestration module 107 can then export the routing tables as a configuration file, or almanac 103, with the parameters for configuring the communication network to mission planning module 110, command and control module 115, and/or data storage. In some examples, orchestration module 107 may further convert the universal routing tables into router-specific formatted files, which can be uploaded/uplinked and applied to routers onboard the satellites.

Mission planning module 110 may present almanac 103 through the user interface of mission planning module 110 to allow a user to view a status and mapping of satellites 125 and the communication network. A user may interact with almanac 103 to view specific hop points and pathways within the communication network, along with corresponding properties (e.g., bandwidth and latency targets) between nodes of the communication network, and timeframes that specific nodes may be in communication with one another.

Command and control module 115 can use almanac 103 to apply router configuration 104 to equipment of satellites 125 to implement the communication network. In various examples, this may entail converting routing tables of almanac 103 to vendor specific configuration formats. In an example, command and control module 115 may provide router configuration 104 to each satellite that may participate in the communication network via ground station 120. In another example, command and control module 115 may provide router configuration 104 to one satellite participating in the communication network, such as the first satellite, and the satellite can distribute router configuration 104 through a cross-link communication. Regardless, an upload or configuration of equipment onboard satellites 125 may occur via a plug-in to the equipment. Command and control module 115 can utilize different plug-ins for different satellites, and thus, may use several formats for router configuration 104, such as YANG/XML, JSON or any other string-based format. Using router configuration 104, command and control module 115 can establish the communication network among implicated satellites to allow the satellites to send communications and data between each other and ground station 120 during the time interval and with parameters specified in request 101. In some examples, command and control module 115 deploys such configurations using Netconf.

Advantageously, a mesh network among satellites 125 can be dynamically generated during live-flight operations of satellites 125 to allow for one-to-one or one-to-many cross-linked satellites for the transfer of data and communications across a constellation of satellites in orbit around Earth. This process may allow a ground station to receive data outside of a timeframe or line-of-sight that it would not ordinarily be able to receive. In various examples, orchestration system 105 can apply such techniques to accommodate for several orbit types, different connections between various nodes among a constellation and on Earth, and with varying parameters via application of multiple different routing algorithms to generate time-tagged routing tables. Many of the aforementioned networks can be established over one or more constellations in a concurrent or partially overlapping timeframe, such that communications of more than one dynamically-configured network co-exist over at least some shared satellites. Segregation of the traffic among the various networks can be established using various network segregation or segmentation techniques, with various virtual private networks or encryption techniques applied thereto.

Moving to FIG. 2, FIG. 2 illustrates a method of establishing a communication network between satellites in a constellation in an implementation. FIG. 2 includes operational scenario 200 noted parenthetically in the discussion below and which reference elements of FIG. 1. In an example, operational scenario 200 may be performed by a network orchestration system, such as orchestration system 105 of FIG. 1. Operational scenario 200 may be executed by hardware, software, firmware, or any combination or variation thereof.

In operation 210, interface module 106 of orchestration system 105 obtains (210) request 101 from mission planning module 110 to generate a communication network for a time interval among a constellation of satellites 125. In various examples, mission planning module 110 may include a user interface through which a user can submit request 101 that includes a set of requirements corresponding to a desired communication network, and characteristics and performance thereof, between satellites 125 for a time interval. The set of requirements may include identities of preferred satellites in the constellation of satellites 125 to be included in the communication network (e.g., a starting satellite and an ending satellite to be included in the communication network), a bandwidth target, a latency target, a quality of service target, a selected routing algorithm, and a timeframe target that includes the time interval during which the communication network is to be established. Various other parameters, preferences, inputs, nodes and endpoints (including other types of devices), target metrics, and modes of operation can be specified.

Interface module 106 may also receive or otherwise obtain constellation information 102 from mission planning module 110, command and control module 115, or some data structure and provide both request 101 and constellation information 102 to orchestration module 107. Command and control module 115 may be representative of a computing device, such as a computer, tablet, smart phone, or other device capable of configuring parameters of satellites 125 or equipment thereof, controlling operations of satellites 125, and the like via ground station 120. Command and control module 115 may include a user interface through which a user can view constellation information 102, configure satellites 125, and control satellites 125 via ground station 120. Constellation information 102 may include information about satellites 125, such as a number of satellites 125 in a constellation, the types of satellites 125, respective locations of satellites 125 within the constellation, capabilities of satellites 125 (e.g., types of equipment onboard satellites 125), transit nodes of the constellation (e.g., satellites, ground stations, other space assets), access nodes within the constellation (e.g., network, gateway, loopback from which data is received and to which data is sent by way of one or more transit nodes), data flows between satellites 125 and a communication network, and the like. In some examples, orchestration system 105 may receive or otherwise obtain constellation information 102 from mission planning module 110 or command and control module 115. In other examples, orchestration system 105 may receive, obtain, or access constellation information 102 from a data structure of or coupled to orchestration system 105.

Satellites 125 may include any number of satellites in orbit around Earth (e.g., low-Earth orbit). Each of satellites 125 may include hardware, software, and/or firmware elements to communicate with each other and ground station 120, to capture data during orbit, and to control operations of elements onboard satellites 125 per instructions from command and control module 115. In an example embodiment, satellites 125 each include routers and other networking equipment that can be configured in different ways at varying times to establish a communication network among a number of satellites 125 and ground station 120, among other ground stations or terrestrial objects/locations (not shown). In another example embodiment, satellites 125 each include software-defined elements that can perform router and networking functions to establish a communication network among a number of satellites 125 and ground station 120.

In operation 211, orchestration module 107 identifies (211) one or more connectivity graphs for the constellation based on a state of the constellation during the time interval. More specifically, orchestration module 107 can generate a connectivity graph from the perspective of the constellation and including each satellite implicated by request 101 during one or more time slices within the time interval. The connectivity graphs for each time slice may include a mapping indicating implicated satellites and communication lines-of-sight from a satellite to one or more other satellites or other terrestrial locations, which may include reachability metrics corresponding to a physical distance or communication distance between each satellite or communication nodes thereof, a duration for which a given pair of satellites can communicate with each other, a projected quality of communication between a given pair of satellites, a projected signal strength of the communication between a given pair of satellites, and the like, during the time slice. The connectivity graphs may include a graph or chart with edges, vertices, and indications illustrative of a satellite, neighboring satellites, and respective positions thereof.

Orchestration module 107 can utilize information from each connectivity graph during the time interval to create a reachability matrix that may include the reachability metrics and mappings from the perspective of each satellite. The reachability matrix might include all satellites 125 of a constellation or a subset of satellites 125, may span over many constellations, and can indicate a validity timeframe for each communication route during the entire time interval. In some examples, the reachability matrix may include a graph including edges, vertices, and data corresponding to the implicated satellites and communication parameters between the satellites. In other examples, the reachability matrix may include one or more tables or other data structures or mathematical formats.

In operation 212, orchestration module 107 applies (212) a selected routing algorithm against the connectivity graph for the constellation to generate a communication route among the constellation during the time interval. The routing algorithm can be selected using various techniques, such as being specified in request 101, or selected from among a set of predefined algorithms provided by orchestration module 107. In this manner, a user might select from among several provided algorithms, or may instead be provided/selected on-the-fly or according to functional descriptions or mission requirements. Example routing algorithms include one or more among a lowest latency routing algorithm, a highest bandwidth routing algorithm, a shortest distance routing algorithm, a hop minimization algorithm, and a Dijkstra's routing algorithm, among others. The routing algorithm can be selected to optimize, minimize, or maximize certain parameters, such as latency, distance, availability timeframe, bandwidth, or other factors. Based on the selected routing algorithm, orchestration module 107 can identify edge weights, factors, or costs for each communication path identified in the connectivity graph or reachability matrix and determine a route among a number of satellites 125 to establish the communication network which satisfies the requirements of at least request 101.

In operation 213, orchestration module 107 can produce a set of parameters to configure routing of the route among the number of satellites 125 to establish the communication network for the time interval. In various examples, orchestration module 107 can generate one or more routing tables based on the results of applying the routing algorithm to the connectivity graph. The routing tables may include a data flow table, a primary label registry, a forwarding information base (FIB) table, an LFIB table, and an Internet-Protocol (IP) forwarding table, among other information. Orchestration module 107 may generate a universal routing table using the data flows and registry information to include this information in multiple formats such that the information can be applied to any router (e.g., via translation into a router-specific configuration file) to configure the route for the communication network among satellites 125. Thus, in some examples, the universal routing table may include parameters, addresses, and other parameters for configuring the communication network across many different types of routing equipment employing different manufacturers, brands, versions, protocols, interface control schemes, and the like. Orchestration module 107 can then export the universal route table as a configuration file (almanac 103) with the set of parameters for configuring the communication network to mission planning module 110, command and control module 115, and/or storage.

Mission planning module 110 may present almanac 103 through the user interface of mission planning module 110 to allow a user to view a status and mapping of satellites 125 and the communication network. A user may interact with almanac 103 to view specific hop points and pathways within the communication network, along with corresponding properties (e.g., bandwidth and latency targets) between nodes of the communication network, and timeframes that specific nodes may be in communication with one another.

Command and control module 115 can use almanac 103 to apply router configuration 104 to equipment of satellites 125 to implement the communication network. In an example, command and control module 115 may provide router configuration 104 to each implicated satellite in the communication network via ground station 120. In another example, command and control module 115 may provide router configuration 104 to one satellite participating in the communication network, such as the first satellite, and the satellite can distribute router configuration 104 through a cross-link communication (e.g., satellite-to-satellite). Regardless, satellites 125 can establish the communication network among each other using router configuration 104 to send communications and data between each other and ground station 120 during the time interval and with parameters specified in request 101.

Figure 3:
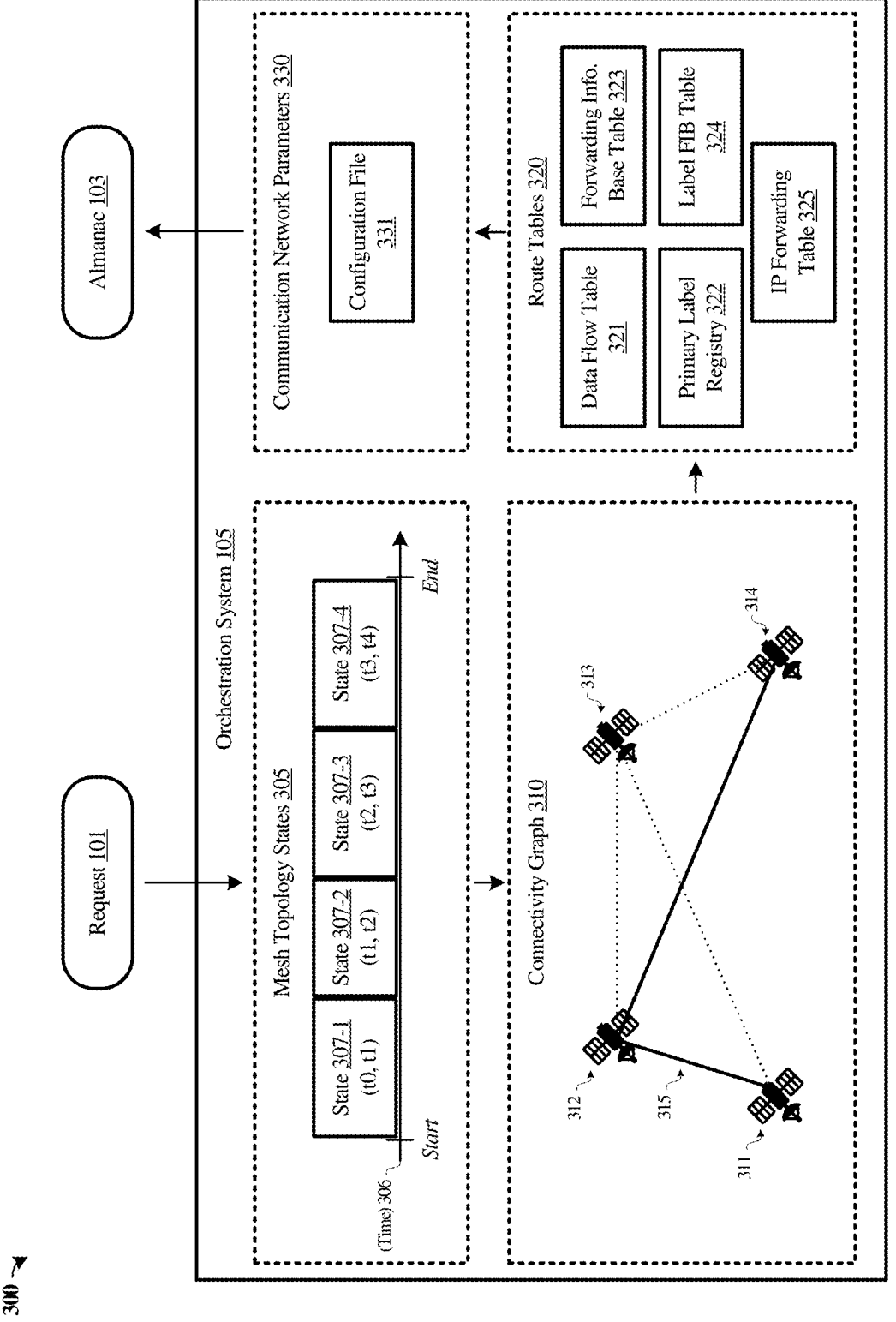
FIG. 3 illustrates exemplary elements used by an orchestration system to configure a communication network in an implementation.

FIG. 3 illustrates exemplary elements used by an orchestration system 105 to configure a communication network in an implementation. FIG. 3 includes operating environment 300, which includes orchestration system 105 of FIG. 1 that receives request 101 as an input and produces almanac 103 as an output. Orchestration system 105 includes mesh topology states 305, connectivity graph 310, route tables 320, and communication network parameters 330 to produce almanac 103.

Orchestration system 105 may be representative of a system or apparatus including various hardware, software, and/or firmware components capable of communicating with other systems or devices (e.g., mission planning module 110, command and control module 115) to receive request 101 and to provide almanac 103 with which the other systems or devices may use to configure communication elements of satellites among a constellation orbiting Earth.

Request 101 may include a set of requirements corresponding to a desired communication network, and characteristics and performance thereof, between a subset of the satellites in the constellation for a time interval. The set of requirements may include identities of preferred satellites in the constellation to be included in the communication network (e.g., a starting satellite and an ending satellite to be included in the communication network), a bandwidth target, a latency target, a quality of service target, a selected routing algorithm, and a timeframe target that includes the time interval during which the communication network is to be established. Various other parameters, preferences, inputs, target metrics, and modes of operation can be specified.

Orchestration system 105 may use request 101 along with other information about the satellites, such as a number of satellites in the constellation, the types of satellites in the constellation, respective locations of identified satellites within the constellation, capabilities of the satellites, and the like (e.g., constellation information 102), to generate mesh topology states 305. Mesh topology states 305 may include state information about each satellite implicated by request 101 with respect to time 306. The state information may refer to positions and orientations of one or more of the satellites relative to one another and to earth or to specific terrestrial locations (such as ground station 120), which may be identified using telemetry data, ephemeris data, and/or calculated trajectories of each satellite. The state information may further include future positions and orientations of the one or more satellites based on scheduled maneuvers of the satellites. In an example, mesh topology states 305 includes states 307-1, 307-2, 307-3, and 307-4 (collectively referred to as states 307) relative to time 306. State 307-1 may include state information about the implicated satellites between the first time (t0) and a second time (t1). State 307-2 may include state information about the implicated satellites between the second time (t1) and a third time (t2). State 307-3 may include state information about the implicated satellites between the third time (t2) and a fourth time (t3).

State 307-4 may include state information about the implicated satellites between the fourth time (t3) and a fifth time (t4). It follows that during an orbit, the positions and orientations of the satellites may change over time for certain durations.

Orchestration module 107 identifies connectivity graphs, such as connectivity graph 310, for the satellites implicated by request 101 based on a state of the constellation during the identified time interval. Connectivity graph 310 may include a number of individual connectivity graphs, each connectivity graph from the perspective of the constellation at a different time slice (e.g., state 307-1, state 307-2, state 307-3, state 307-4) and including each satellite implicated by request 101. Each connectivity graph may include a mapping of the satellites and communication lines-of-sight from a satellite to one or more other satellites, which may include reachability metrics corresponding to a physical distance or communication distance between each satellite or communication nodes thereof, a duration for which given pair of satellites can communication with each other, a projected quality of communication between a given pair of satellites, a projected signal strength of the communication between a given pair of satellites, and the like, during the time interval. Connectivity graph 310 illustrates an example connectivity graph when the constellation is in state 307-1 during a first time slice between a first time (t0) and a second time (t1) within the time interval. While not shown, additional connectivity graphs may be determined at states 307-2, 307-3, and 307-4 of the constellation and include the same or different satellites in various positions and orientations based on planned maneuvers of the satellites during the time interval.

As illustrated in operating environment 300, connectivity graph 310 shows four satellites, satellites 311, 312, 313, and 314, at respective positions and with respective orientations according to one of states 307 of mesh topology states 305, such as state 307-1. The mapping of connectivity graph 310 may correspond to a state of mesh topology states 305 during time 306 that aligns with a time during the time interval indicated in request 101 (e.g., between t0 and t1). During this state, satellite 311 may be able to communicate with satellite 312 and satellite 313, satellite 312 may be able to communicate with satellite 311, satellite 313, and satellite 314, satellite 313 may be able to communicate with satellite 311, satellite 312, and satellite 314, and satellite 314 may be able to communicate with satellite 312 and satellite 313. Accordingly, for a request 101 that indicates a desire to establish a communication network between satellites 311 and 314, orchestration module 107 may determine that satellites 311 and 314 may not be able to communicate directly with each other and identify other communication routes to establish the desired communication network (i.e., a communication route from satellite 311 through either satellite 312 or satellite 313 to satellite 314) during this first time slice.

Orchestration module 107 can apply a selected routing algorithm against connectivity graph 310, among other connectivity graphs, for the constellation. The routing algorithm can be selected using various techniques, such as being specified in request 101 (i.e., by specifying a predefined algorithm and including a set of metadata for use in the algorithm), or selected from among a set of predefined algorithms provided by orchestration module 107. In this manner, a user might select from among several provided algorithms, or may instead be provided/selected on-the-fly or according to functional descriptions or mission requirements. Example routing algorithms may include one or more among a lowest latency routing algorithm, a highest band-width routing algorithm, a shortest distance routing algo-rithm, a hop minimization algorithm, and a Dijkstra's rout-ing algorithm, among others. The routing algorithm can be selected to optimize, minimize, or maximize certain param-eters, such as latency, distance, availability timeframe, band-width, or other factors. Based on the selected routing algo-rithm, orchestration module 107 can identify edge weights, factors, or costs (e.g., reachability metrics), for each com-munication path identified in the connectivity graph and determine a route among a number of the satellites to establish the communication network which satisfies the requirements of at least request 101. For example, orches-tration module 107 may identify reachability metrics related to a duration for which a given pair of satellites can communicate with each other, a projected quality of com-munication between a given pair of satellites, a projected signal strength of the communication between a given pair of satellites, and the like, during the time interval. In this example, orchestration module 107 may determine that communication route 315, which includes communications between satellites 311 and 312 and between satellites 312 and 314, is an available communication route for the time interval which satisfies the requirements of request 101.

Based on connectivity graph 310, orchestration module 107 can produce route tables 320 with configuration infor-mation corresponding to selected communication route 315 between satellites 311, 312, and 314. Route tables 320 may include data flow table 321, primary label registry 322, forwarding information base (FIB) table 323, label forward-ing information base (LFIB) table 324, and Internet-Protocol (IP) forwarding table 325. Orchestration module 107 may generate a universal routing table using this information in multiple formats such that the information can be applied to any router to configure the route for the communication network among satellites 311, 312, and 314. Thus, in some examples, the universal routing table may include param-eters, addresses, and other parameters for configuring the communication network across many different types of routing equipment employing different manufacturers, brands, versions, protocols, interface control schemes, and the like. Orchestration module 107 can then generate com-munication network parameters 330 from route tables 320 for configuring the communication network. Communica-tion network parameters 330 may include configuration file 331 that includes router parameters in different languages to allow for the programming of any type of router onboard satellites 311, 312, and 314 to establish the communication network during the time interval.

Orchestration module 107 can output almanac 103, including mesh topology states 305, connectivity graph 310, route tables 320, and communication network parameters 330 to one or more systems or devices, such as mission planning module 110 and command and control module 115 of FIG. 1.

FIG. 4 illustrates exemplary routing tables used to con-figure a communication network in an implementation. FIG. 4 includes primary label registry table 401, data flow table 402, label forwarding information base (LFIB) table 403, Internet-Protocol (IP) forwarding table (IPFT) 404, and forwarding information base (FIB) 405, which refer to elements of FIG. 3. In various examples, primary label registry table 401, data flow table 402, LFIB table 403, IP forwarding table 404, and FIB 405 may be included in a universal route table (e.g., route table 320 of FIG. 3) by an orchestration system (e.g., orchestration system 105 of FIGS. 1 and 3) during communication network configura-tion processes.

Primary label registry table 401 includes a table listing each satellite in a constellation, such as satellites 311, 312, 313, and 314 of FIG. 3, and a respective multiprotocol label switching (MPLS) (packet forwarding technology using numeral labels to make fast forwarding decisions) reference label for each satellite. In this example, satellite 311 may be associated with MPLS label 101, satellite 312 may be associated with MPLS label 102, satellite 313 may be associated with MPLS label 103, and satellite 314 may be associated with MPLS label 104. In some examples, some nodes or satellites may not include an MPLS label and, thus, may support IP only.

Data flow table 402 includes a table listing identifiers, source nodes, destination nodes, and destination IP prefixes based on communication network parameters identified by applying a routing algorithm to a connectivity graph. Data flow table 402 includes a first identifier with a source node of "DN1", a destination node of "DN4", and a destination IP prefix of "40.40.40.0/24".

LFIB table 403 includes a table listing MPLS information associated with the first node in a communication network, such as an incoming label, an outgoing label, an outgoing interface, a next hop address, and an MPLS operation. LFIB table 403 may be used by a label switch router (LSR) (e.g., a router that handles labeled packets that arrive and swaps labels on the packet) to lookup where to route data. In this example, satellite 311 is the first node in the communication network, so "101" is listed as the incoming label corre-sponding to primary label registry table 401. The outgoing interface for satellite 311 may be listed as "loopback", and the MPLS operation may be listed as "POP."

IP forwarding table 404 includes a table listing IP infor-mation associated with the communication network, such as a destination IP prefix, an outgoing interface, and a next hop address. In this example, the destination IP prefix is "10.10.10.0/24" and the outgoing interface is "GEO/0."

FIB table 405 includes a table listing MPLS information associated with the last node in the communication network, such a destination IP prefix, an outgoing label, an outgoing interface, and a next hop address. FIB table 405 may be a table used by a label edge router (LER) that handles unla-beled packets that arrive and pushes an MPLS label onto the packet. In this example, satellite 314 is the last node in the communication network, so "104" is listed as the outgoing label corresponding to primary label registry table 401. The destination IP prefix may be listed as "40.40.40.0/24", the outgoing interface may be listed as "GEO/1", and the next hop address may be listed as "192.168.1.2".

In other examples, a routing table may include additional or fewer tables and different information based on the requirements for establishing a communication network, capabilities of satellites in the constellation, and the like. Further, a universal routing table may be determined using various routing tables, which may include parameters, addresses, and other parameters for configuring the commu-nication network across many different types of routing equipment employing different manufacturers, brands, ver-sions, protocols, interface control schemes, and the like following translation of the universal routing table into a router-specific configuration file. For example, the universal routing table may include data for any router format adapt-able for a given mission, including MPLS and IPv4, among other formats.

Figure 5:
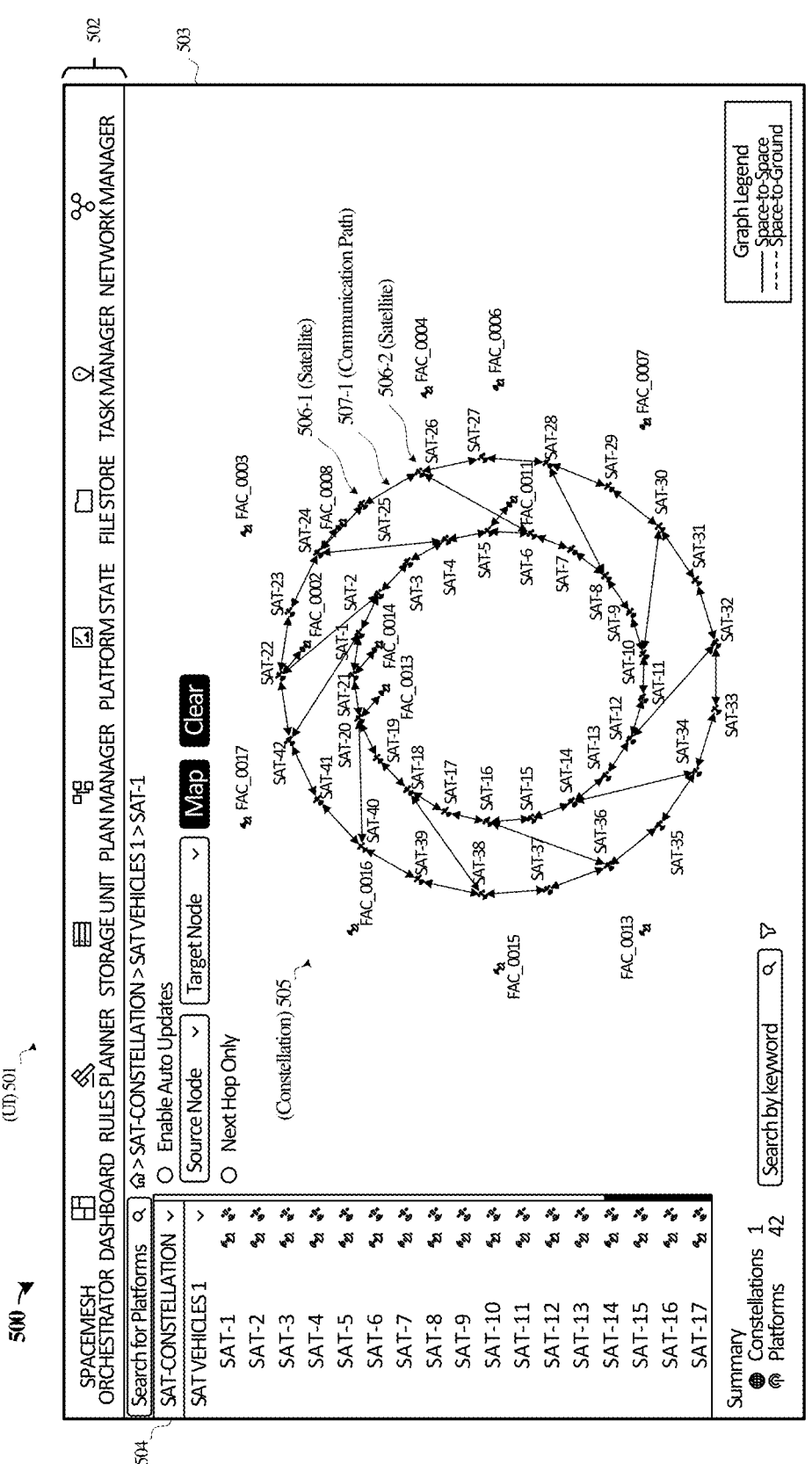
FIG. 5 illustrates an exemplary aspect of a user interface used in an implementation.

FIG. 5 illustrates an exemplary aspect of a user interface (UI) 501 used in an implementation. FIG. 5 includes UI 501, which includes function toolbar 502, display window 503, and asset list 504. In various examples, UI 501 may be presented in a computing device or system, such as mission planning module 110 or command and control module 115 of FIG. 1.

In use, UI 501 can provide a visual representation of assets in a system, such as satellites 506 in constellation 505, and functions of an application presented through UI 501. Function toolbar 502 may include one or more icons representative of functions or views that can be navigated through by interacting with UI 501 (e.g., touch, click, tap, swipe). For example, function toolbar 502 may include icons representative of a dashboard function, a rules planner function, a storage unit function, a plan manager function, a platform state function, a file store function, a task manager function, and a network manager function, among other functions and views. Upon interacting with an option of function toolbar 502, UI 501 may present a visual representation on display window 503.

In aspect 500, UI 501 shows an example visual representation of constellation 505 on display window 503. Constellation 505 may include a number of satellites 506 arranged in concentric rings, although other arrangements may be contemplated. Asset list 504 may include a list of satellites 506, among other space-deployed assets, ground stations, and the like. Each satellite of constellation 505 may communicate with one or more other neighboring satellites in constellation 505. The lines connecting each satellite in the visual representation shown in display window 503 may represent communication paths 507 between the satellites. For example, satellite 506-1 and satellite 506-2 may communicate with each other via communication path 507-1.

In various examples, a user may click, tap, touch, or otherwise interact with each satellite of constellation 505 to view information about the satellite, zoom in or zoom out on display window 503 to view communication paths 507 between satellites 506, and toggle between different constellations, if available, among other functions. For instance, a user may click on satellite 506-1 to view a state of satellite 506-1. The state of a satellite may refer to an operation status, a current position, a current orientation, and scheduled maneuvers of the satellite, among other information.

Figure 6:
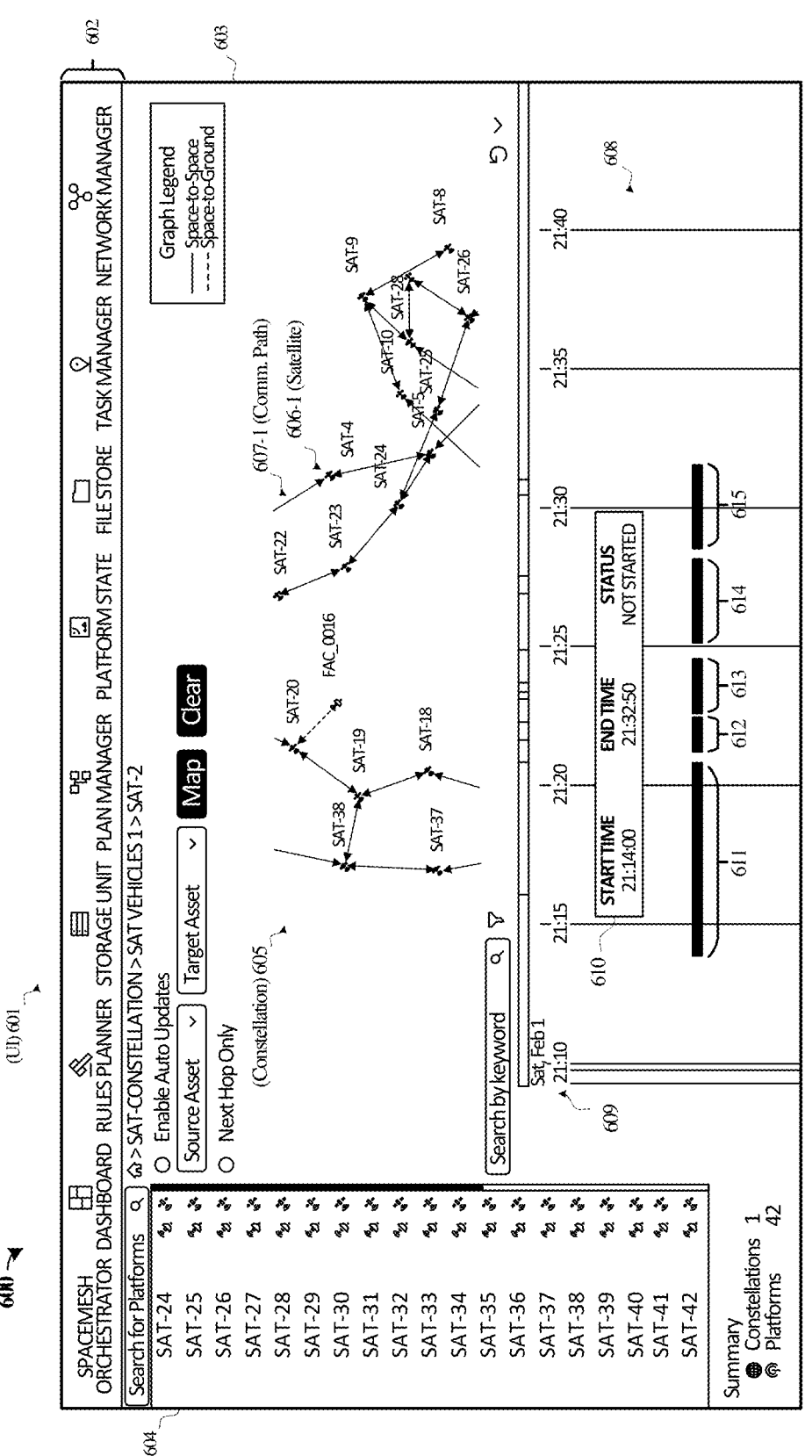
FIG. 6 illustrates an exemplary aspect of a user interface used in an implementation.

FIG. 6 illustrates an exemplary aspect of user interface (UI) 601 used in an implementation. FIG. 6 includes UI 601, which includes function toolbar 602, display window 603, asset list 604, and connectivity graph 608. In various examples, UI 601 may be presented in a computing device or system, such as mission planning module 110 or command and control module 115 of FIG. 1.

In use, UI 601 can provide a visual representation of assets in a system, such as satellites 606 in constellation 605, and functions of an application presented through UI 601. Function toolbar 602 may include one or more icons representative of different functions or views that can be navigated through by interacting with UI 601 (e.g., touch, click, tap, swipe). For example, function toolbar 602 may include icons representative of a dashboard function, a rules planner function, a storage unit function, a plan manager function, a platform state function, a file store function, a task manager function, and a network manager function, among other functions and views. Upon interacting with an option of function toolbar 602, UI 601 may present a visual representation on display window 603.

In aspect 600, UI 601 shows an example visual representation of constellation 605 on display window 603. Constellation 605 may include a number of satellites 606 arranged in orbit. However, display window 603 may show only a portion of satellites 606 as UI 601 may present a zoomed-in view of constellation 605 in aspect 600. Asset list 604 may include a list of satellites 606, among other space-deployed assets, ground stations, and the like. Each satellite of constellation 605 may communicate with one or more other neighboring satellites in constellation 605. The lines connecting each satellite in the visual representation shown in display window 603 may represent communication paths 607 between the satellites. For example, satellite 606-1 may communicate with another satellite via communication path 607-1.

UI 601 may include connectivity graph 608 in a portion of display window 603. Connectivity graph information 610 may also be displayed on display window 603 and include information about connectivity graph 608, such as a start time, end time, and status of communication network. Connectivity graph 608 may include a timewise view of states of constellation 605 with respect to time 609. The states of constellation 605 may refer to positions and orientations of satellites 606 relative to one another and to earth, the moon, or other terrestrial objects, or to specific terrestrial locations, such as ground stations, which may be identified using telemetry data, ephemeris data, and/or calculated trajectories of each satellite.

Connectivity graph 608 includes states 611, 612, 613, and 614. Satellites 606 of constellation 605 may operate in each of states 611, 612, 613, 614, and 615 for different durations of time 609 during a time interval shown in connectivity graph information 610 (e.g., between 21:14:00 and 21:32:50). By way of example, satellites 606 may be in state 611 for a first duration, state 612 for a second duration, state 613 for a third duration, state 614 for a fourth duration, and state 615 for a fifth duration as illustrated in the timewise view shown in display window 603. In some examples, states 611-615 may correspond to a subset of satellites 606 in constellation 605. In other examples, states 611-615 may correspond to all of satellites 606 in constellation 605.

Figure 7:
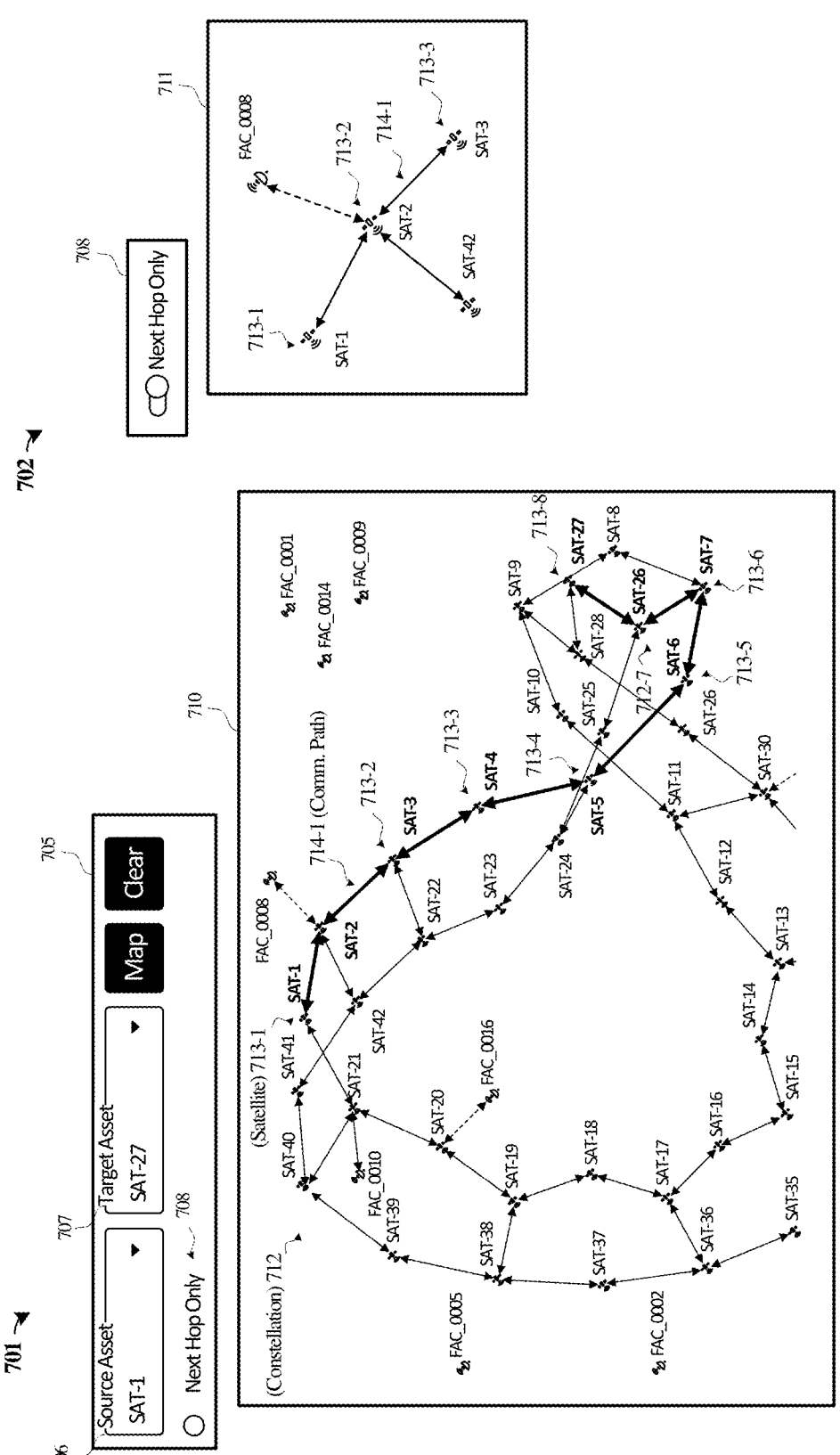
FIG. 7 illustrates exemplary aspects of a user interface used in an implementation.

FIG. 7 illustrates exemplary aspects of a user interface (UI) used in an implementation. FIG. 7 includes aspect 701, which includes asset selection menu 705 and display window 710 of a UI, and aspect 702, which includes hop selector menu 708 and display window 711 of a UI. In various examples, the menus and display menus of aspects 701 and 702 may be included in a user interface (e.g., UI 501 of FIG. 5, UI 601 of FIG. 6) of a computing device or system, such as mission planning module 110 or command and control module 115 of FIG. 1.

Referring first to aspect 701, asset selection menu 705 represents a portion of a UI that a user can use to input and view a source asset 706 (e.g., a first satellite) and a target asset 707 (e.g., a last satellite) to be used in a communication network among a constellation 712 of satellites 713. As illustrated, a user may select "SAT-1" (satellite 713-1) as the source asset 706 and "SAT-27" (satellite 713-8) as the target asset 707 for a communication network. Asset selection menu 705 may also include a "map" function, a "clear" function, and a "next hop only" function (hop selector menu 708), each of which a user can click, tap, touch, or otherwise interact with to influence the content displayed on display window 710. For example, when a user clicks "map," visual representations of communication paths 714 between specific satellites 713 of constellation 712 may be displayed in display window 710 (denoted by bolded lines in display window 710). When a user clicks "clear," the visual representations of communication paths 714 may be reverted to a default or different setting.

It follows that display window 710 may display visual representations of constellation 712, satellites 713 of constellation 712, and communication paths 714 between individual ones of satellites 713. In this example, an orchestration system, such as orchestration system 105 of FIG. 1, may identify communication paths 714 between satellites 713-1 and 713-8 based on the selection of source asset 706 and target asset 707, among other requirements and information. Communication paths 714 may be displayed using bolded lines, colored lines, or by some other indication in display window 710.

Referring next to aspect 702, aspect 702 includes hop selector menu 708 of asset selection menu 705 and display window 711. Hop selector menu 708 may include a button, toggle switch, or other icon that a user can interact with to enable or disable a view of visual representations displayed in a display window of a UI. In this aspect, a user may enable functionality of hop selector menu 708 to show a "next hop" in a communication network established among satellites 713 of constellation 712 in display window 711. When "next hop" is enabled via hop selector menu 708, display window 711 may include visual representations of a portion of constellation 712 including a satellite following the source asset 706 along communication paths 714 (e.g., satellite 713-2). More specifically, display window 711 may include a visual representation of satellite 713-2, neighboring satellites relative to satellite 713-2, and communication paths between satellite 713-2 and the neighboring satellites.

In various other examples, a user may select a different combination of satellites 713 of constellation 712 for source asset 706 and target asset 707, which may cause an orchestration system to generate other communication paths and the UI to display different visual representations on display windows 710 and 711. Accordingly, as a user interacts with UI 701, the user can dynamically build a mesh communication network among constellation 712 based on inputs provided to UI 701.

Figure 8:
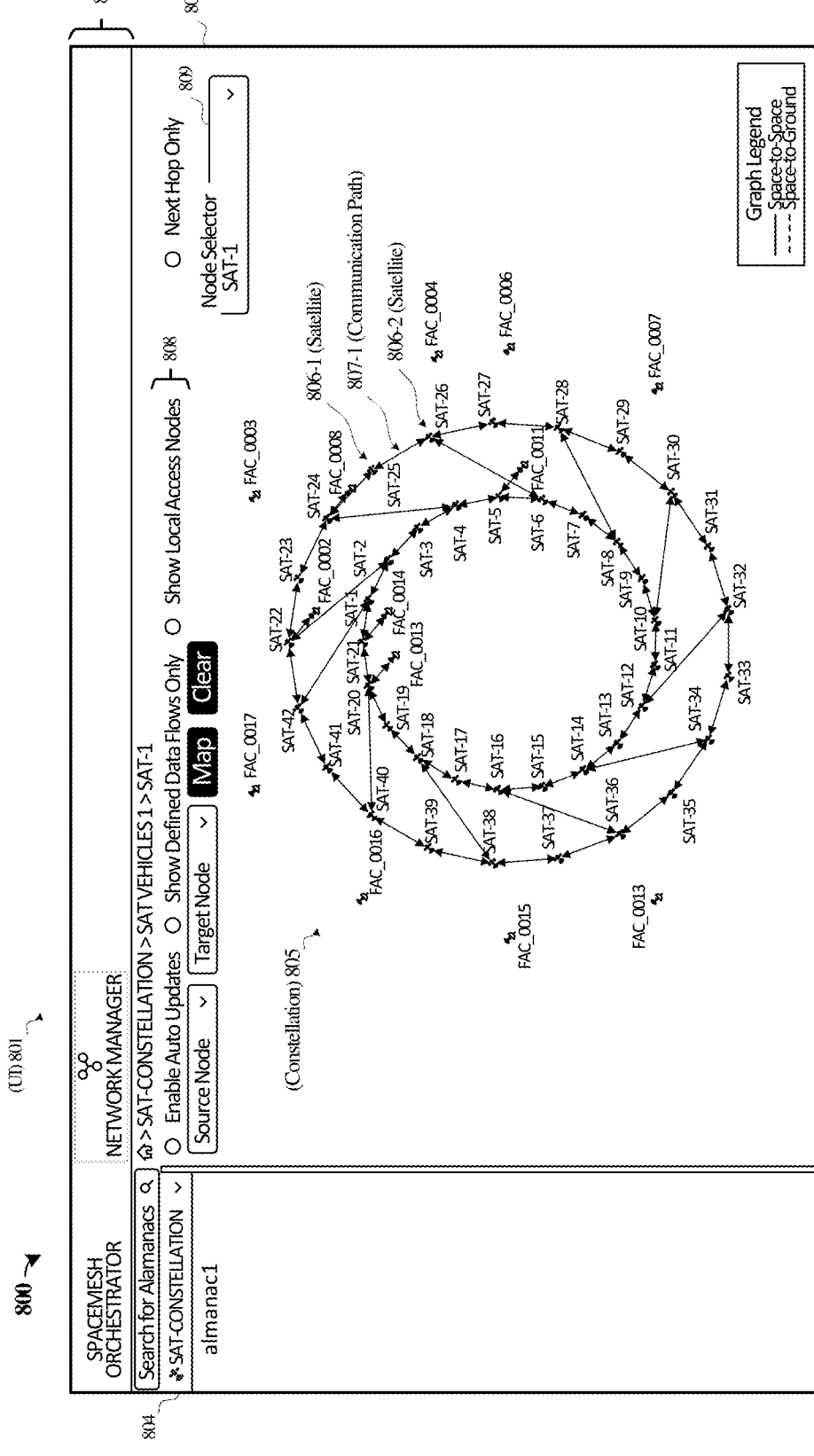
FIG. 8 illustrates exemplary aspects of a user interface used in an implementation.

FIG. 8 illustrates exemplary aspects of a user interface used in an implementation. FIG. 8 includes UI 801, which includes function toolbar 802, display window 803, and almanac list 804. In various examples, UI 801 may be presented in a computing device or system, such as mission planning module 110 or command and control module 115 of FIG. 1.

In use, UI 801 can provide a visual representation of assets in a system, such as satellites 806 in constellation 805, and functions of an application presented through UI 801. Function toolbar 802 may include one or more icons representative of functions or views that can be navigated through by interacting with UI 801 (e.g., touch, click, tap, swipe). For example, function toolbar 802 may include an icon representative of a network manager function, among other functions and views. Upon interacting with an option of function toolbar 802, UI 801 may present a visual representation on display window 803.

In aspect 800, UI 801 shows an example visual representation of constellation 805 on display window 803 based on the network manager function of functional toolbar 802. Constellation 805 may include a number of satellites 806 arranged in concentric rings, although other arrangements may be contemplated. Almanac list 804 may include a list of almanacs (e.g., almanac 103), and each almanac listed and displayed in almanac list 804 may include mapping indications of constellation 805 and satellites 806 thereof, communication paths 807 between satellites 806, and metrics and information about satellites 806 and communication paths 807, such as applicable time windows for communication paths 807, indications of lines-of-sight between satellites 806, and router configuration parameters of satellites 806 to enable communication paths 807, among other information. Accordingly, for an almanac, a number of satellites of constellation 805 may communicate with one or more other neighboring satellites in constellation 805 for a time interval. The lines connecting each satellite in the visual representation shown in display window 803 may represent communication paths 807 between the satellites. For example, satellite 806-1 and satellite 806-2 may communicate with each other via communication path 807-1.

In various examples, a user may click, tap, touch, or otherwise interact with each satellite of constellation 805 to view information about the satellite, zoom in or zoom out on display window 803 to view communication paths 807 between satellites 806, and toggle between different hops or nodes (via node selector 809) of constellation 805, among other functions. For instance, a user may click on satellite 806-1 to view a state of satellite 806-1 at a given time. The state of a satellite may refer to an operation status, a current position, a current orientation, and scheduled maneuvers of the satellite, among other information. Additionally, a user may enable one or more options that provide different functionality via toggle buttons 808 displayed on display window 803. Toggle buttons 808 may include options related to enabling automatic updates of a selected almanac (e.g., router configuration updates), showing defined data flows only, and showing local access nodes within constellation 805. Other options may also be included in UI 801.

In some embodiments, display window 803 may further include a timewise view corresponding to the almanac selected from almanac list 804, which may indicate timing information about communication paths 807 over a time interval (e.g., connectivity graph 608). As such, a user may be able to view which communication paths may be valid for a given time during a time interval, for example, based on the almanac selection.

Figure 9:
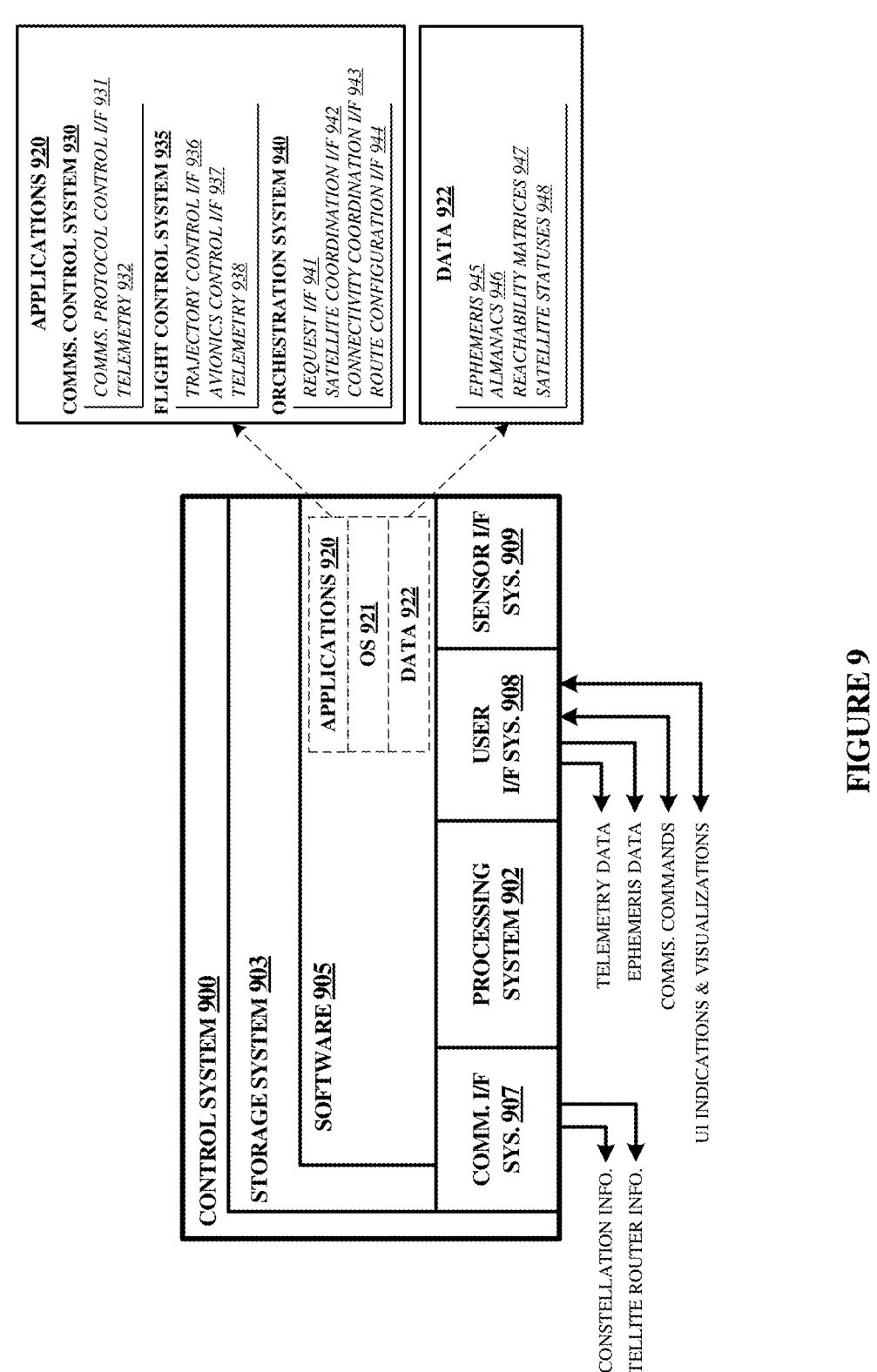
FIG. 9 illustrates a communication control system in an implementation.

FIG. 9 illustrates control system 900 and associated software 905 in an implementation. FIG. 9 illustrates control system 900 that is representative of any system or collection of systems in which the various operational architectures, scenarios, and processes disclosed herein may be implemented. For example, control system 900 can be used to implement elements of orchestration system 105 of FIGS. 1 and 3, user interface 501 of FIG. 5, user interface 601 of FIG. 6, and user interface 701 of FIG. 7.

Control system 900 may be implemented as a single apparatus, system, or device or may be implemented in a distributed manner as multiple apparatuses, systems, or devices. Control system 900 includes, but is not limited to, processing system 902, storage system 903, software 905, communication interface system 907, user interface system 908, and sensor interface system 909. Processing system 902 is operatively coupled with storage system 903, communication interface system 907, user interface system 908, and sensor interface system 909.

Processing system 902 loads and executes software 905 from storage system 903. Software 905 includes applications 920, which are representative of the processes, services, and platforms discussed with respect to the included Figures. When executed by processing system 902 to produce a set of parameters to configure routing of a communication route among a constellation of satellites to establish a communication network for a time interval indicated in a request, among other services, software 905 directs processing system 902 to operate as described herein for at least the various processes, operational scenarios, and sequences discussed in the foregoing implementations. Control system 900 may optionally include additional devices, features, or functionality not discussed for purposes of brevity.

Referring still to FIG. 9, processing system 902 may comprise a microprocessor and processing circuitry that retrieves and executes software 905 from storage system 903. Processing system 902 may be implemented within a single processing device but may also be distributed across multiple processing devices or sub-systems that cooperate in executing program instructions. Examples of processing system 902 include general purpose central processing units, application specific processors, and logic devices, as well as any other type of processing device, combinations, or variations thereof.

Storage system 903 may comprise any computer readable storage media readable by processing system 902 and capable of storing software 905. Storage system 903 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal. In addition to computer readable storage media, in some implementations storage system 903 may also include computer readable communication media over which at least some of software 905 may be communicated internally or externally. Storage system 903 may be implemented as a single storage device but may also be implemented across multiple storage devices or sub-systems co-located or distributed relative to each other. Storage system 903 may comprise additional elements, such as a controller, capable of communicating with processing system 902 or possibly other systems.

Software 905 may be implemented in program instructions and among other functions may, when executed by processing system 902, direct processing system 902 to operate as described with respect to the various operational scenarios, sequences, and processes illustrated herein. For example, software 905 may include program instructions comprising applications 920, operating system 921, and data 922 that provide configuration of a communication network among a constellation of satellites, among other services. In particular, the program instructions may include various components or modules that cooperate or otherwise interact to carry out the various processes and operational scenarios described herein. The various components or modules may be implemented in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 905 may include additional processes, programs, or components, such as operating system software or other application software, in addition to or that include applications 920. Software 905 may also comprise firmware or some other form of machine-readable processing instructions executable by processing system 902.

Software 905, when loaded into processing system 902 and executed, may transform a suitable apparatus, system, or device (of which control system 900 is representative) overall from a general-purpose computing system into a special-purpose computing system customized to provide configuration of communication network parameters, among other services. Indeed, encoding software 905 on storage system 903 may transform the physical structure of storage system 903. The specific transformation of the physical structure may depend on various factors in different implementations of this description. Examples of such factors may include, but are not limited to, the technology used to implement the storage media of storage system 903 and whether the computer-storage media are characterized as primary or secondary storage, as well as other factors. For example, if the computer-readable storage media are implemented as semiconductor-based memory, software 905 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Applications 920 can include communications control system 930, flight control system 935, and orchestration system 940. Communications control system 930 includes communications protocol control interface 931 and telemetry 932. Flight control system 935 includes trajectory control interface 936, avionics control interface 937, and telemetry 938. Orchestration system 940 includes request interface 941, satellite coordination interface 942, connectivity coordination interface 943, and route configuration interface 944.

Turning first to communications control system 930, communications protocol control interface 931 can direct operation of onboard communications equipment (e.g., routers, switches, software-defined routers) based on configuration parameters provided to communications protocol control interface 931. Telemetry 932 can be configured to collect and store instrumentation data for further transfer during operations of a satellite during orbit.

Turning next to flight control system 935, trajectory control interface 936 may be configured to determine one or more maneuvers and velocities to perform the one or more maneuvers of a satellite. Avionics control interface 937 may be configured to enable operation of onboard instruments and equipment of a satellite during flight and in-orbit operations. Examples of the instruments and equipment may include optical imagers, sensors, gyroscopic/accelerometer, and other elements. Telemetry 938 can be configured to collect and store instrumentation data for further transfer during operations of a satellite during orbit.

Turning next to orchestration system 940, request interface 941 may be configured to receive requests from a user or client indicating a desire for a communication network between endpoints in a constellation of satellites. Satellite coordination interface 942 may be configured to identify states of the satellites in the constellation, a state of the constellation, and coordinate plans for the communication network at the constellation level based on the states. Connectivity coordination interface 943 may be configured to generate constellation network graphs based on ground contacts between implicated satellites and cross-link opportunities between satellites among the constellation. Route configuration interface 944 may be configured to create routing tables, including communication pathways and routes among implicated satellites, for the constellation. Route configuration interface 944 may further be configured to utilize routing tables to create a universal, router-agnostic routing table, and further convert the universal routing table to specific formats utilized by routers and other communication elements onboard satellites implicated by the request.

Data 922 may include various information related to one or more satellites in a constellation and communication network parameters for configuring communication pathways therewith. Data 922 includes ephemeris 945, almanacs 946, reachability matrices 947, and satellite statuses 948. Ephemeris 945 may include ephemeris data related to each satellite in a constellation, including current positions and orientations and projected trajectories. Almanacs 946 may include sets of parameters (e.g., almanac 103) for configuring communication networks among satellites in a constellation. Reachability matrices 947 may include mappings associated with satellites among a constellation within various timeframes (e.g., connectivity graphs), visualized graph-based data structures, metrics and parameters associated with communication routes, pathways, and hop points, and the like. Satellite statuses 948 may include state and status information of each satellite in a constellation corresponding to operational status, instrumentation status, and the like.

Communication interface system 907 may include communication connections and devices that allow for communication with other computing systems or electrical components (not shown) over communication links or communication networks (not shown). Examples of connections and devices that together allow for inter-system communication may include transceivers, network interface controllers, antennas, power amplifiers, RF circuitry, and other communication circuitry. The connections and devices may communicate over communication media to exchange communications with other computing systems or networks of systems, such as metal, glass, air, or any other suitable communication media. Physical or logical elements of communication interface system 907 can provide constellation information, satellite router information, and other information.

Communication interface system 907 may include portions of sensor system interface 909. Sensor system interface 909 comprises various hardware and software elements for interfacing with satellite instrumentation, avionics, sensors, networking devices, and other devices. For example, sensor system interface 909 can receive or obtain position, gyroscope and/or accelerometer data, instrumentation collection data, and the like. Data processing elements or other equipment can be included in sensor system interface 909.

Communication between communication control system 900 and other elements or systems (not shown), may occur over communication links or communication networks and in accordance with various communication protocols, combinations of protocols, or variations thereof. For example, communication control system 900 when implementing a control device, might communicate with sensor elements over corresponding digital communication links comprising Ethernet interfaces, serial interfaces, serial peripheral interface (SPI) links, inter-integrated circuit (I2C) interfaces, universal serial bus (USB) interfaces, UART interfaces, or wireless interfaces. When network links are employed, example networks include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. However, some network communication protocols that may be used include, but are not limited to, the Ethernet, Internet protocol (IP, IPv4, IPv6, etc. . . . ), the transmission control protocol (TCP), and the user datagram protocol (UDP), as well as any other suitable communication protocol, variation, or combination thereof.

User interface system 908 may include a software or virtual interface such as a terminal interface, command line interface, or application programming interface (API). User interface system 908 may also include physical user interfaces, such as keyboard, a mouse, a voice input device, or a touchscreen input device for receiving input from a user. User interface system 908 may include telemetry interfaces, ephemeris interfaces, user command controls, router operation mode command controls, and user interface indications, visualizations, and representations, among others. Output devices such as displays, web interfaces, terminal interfaces, and other types of output devices may also be included in user interface system 908. User interface system 908 can provide output and receive input over a network interface, such as communication interface system 907. In network examples, user interface system 908 might packetize data for receipt by a display system or computing system coupled over one or more network interfaces. User interface system 908 may comprise API elements for interfacing with users, other data systems, other user devices, web interfaces, and the like. User interface system 908 may also include associated user interface software executable by processing system 902 in support of the various user input and output devices discussed above. Separately or in conjunction with each other and other hardware and software elements, the user interface software and user interface devices may support a console user interface, graphical user interface, a natural user interface, or any other type of user interface.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The descriptions and figures included herein depict specific implementations to teach those skilled in the art how to make and use the best options. For the purpose of teaching inventive principles, some conventional aspects have been simplified or omitted. Those skilled in the art will appreciate variations from these implementations that fall within the scope of this disclosure. Those skilled in the art will also appreciate that the features described above can be combined in various ways to form multiple implementations.

What is claimed is:

1. A method, comprising:
   obtaining a request to generate a communication network
   for a time interval among a constellation of satellites;

determining reachability metrics for at least a portion of the satellites based on states of neighboring satellites in the constellation during at least the time interval, the states comprising telemetry data or ephemeris data;

applying the reachability metrics across the constellation to identify identifying one or more connectivity graphs for the constellation during at least the time interval;

applying a selected routing algorithm against the one or more connectivity graphs to generate a communication route among the constellation during the time interval; and producing a set of parameters to configure routing of the communication route among the constellation to establish the communication network for the time interval.

2. The method of claim 1, wherein the request comprises a set of requirements for the communication network indicative of at least one among identities of preferred nodes to be included in the communication network, a bandwidth target, a latency target, a quality of service target, a selected routing algorithm, and a timeframe target that includes the time interval.

3. The method of claim 1, wherein the states further comprise one or more scheduled maneuvers of at least the portion of the satellites in the constellation during at least the time interval.

4. The method of claim 1, wherein the selected routing algorithm comprises at least one among a lowest latency routing algorithm, a highest bandwidth routing algorithm, a shortest distance routing algorithm, a hop minimization algorithm, and a Dijkstra's routing algorithm.

5. The method of claim 1, further comprising presenting a visual representation of the one or more connectivity graphs through a user interface.

6. The method of claim 2, further comprising displaying visual indications of a status of the communication network through the user interface.

7. A system having at least a processor coupled to a memory and, comprising:

an interface module configured to obtain a request to generate a communication network among a constellation of satellites for a time interval indicated by the request; and a network orchestration module coupled to the interface module and configured to:

receive the request from the interface module;

determine reachability metrics for at least a portion of the satellites based on states of neighboring satellites in the constellation during at least the time interval, the states comprising telemetry data or ephemeris data;

process the reachability metrics across the constellation to identify one or more connectivity graphs for the constellation during at least the time interval;

apply a selected routing algorithm against the one or more connectivity graphs to generate a communication route among the constellation during the time interval; and produce a set of parameters to configure routing of the communication route among the constellation to establish the communication network for at least the time interval.

8. The system of claim 7, wherein the request comprises a set of requirements for the communication network indicative of at least one among identities of preferred nodes to be included in the communication network, a bandwidth target, a latency target, a quality of service target, a selected routing algorithm, and a timeframe target that includes the time interval.

9. The system of claim 7, wherein the states further comprise one or more scheduled maneuvers of at least the portion of the satellites in the constellation during at least the time interval.

10. The system of claim 7, wherein the selected routing algorithm comprises at least one among a lowest latency routing algorithm, a highest bandwidth routing algorithm, a shortest distance routing algorithm, a hop minimization algorithm, and a Dijkstra's routing algorithm.

11. The system of claim 7, wherein the interface module is further configured to provide the one or more connectivity graphs for the constellation to a mission control module for presentation of a visual representation of the connectivity graph through a user interface of the mission control module.

12. The system of claim 11, wherein the interface module is further configured to provide the set of parameters to the mission control module, and wherein the mission control module is configured to display visual indications of a status of the communication network through the user interface of the mission control module.

13. An apparatus, comprising:

one or more non-transitory computer-readable storage media; and program instructions stored on the one or more non-transitory computer-readable storage media executable by a processing device to direct the processing device to at least:

obtain a request to generate a communication network for a time interval among a constellation of satellites;

determine reachability metrics for at least a portion of the satellites based on states of neighboring satellites in the constellation during at least the time interval, the states comprising telemetry data or ephemeris data;

process the reachability metrics across the constellation to identify one or more connectivity graphs for the constellation based on a state of the constellation during at least the time interval;

apply a selected routing algorithm against the one or more connectivity graphs to generate a communication route among the satellites during the time interval; and produce a set of parameters to configure routing of the communication route among the constellation to establish the communication network for the time interval.

14. The apparatus of claim 13, wherein the request comprises a set of requirements for the communication network indicative of at least one among identities of preferred nodes to be included in the communication network, a bandwidth target, a latency target, a quality of service target, a selected routing algorithm, and a timeframe target that includes the time interval.

15. The apparatus of claim 13, wherein the states further comprise one or more scheduled maneuvers of at least the portion of the satellites in the constellation during at least the time interval.

16. The apparatus of claim 13, wherein the selected routing algorithm comprises at least one among a lowest latency routing algorithm, a highest bandwidth routing algorithm, a shortest distance routing algorithm, a hop minimization algorithm, and a Dijkstra's routing algorithm.

17. The apparatus of claim 13, wherein the program instructions further direct the processing device to present a visual representation of the communication network for
display through a user interface.

* * * * *